Patented Mar. 8, 1927.

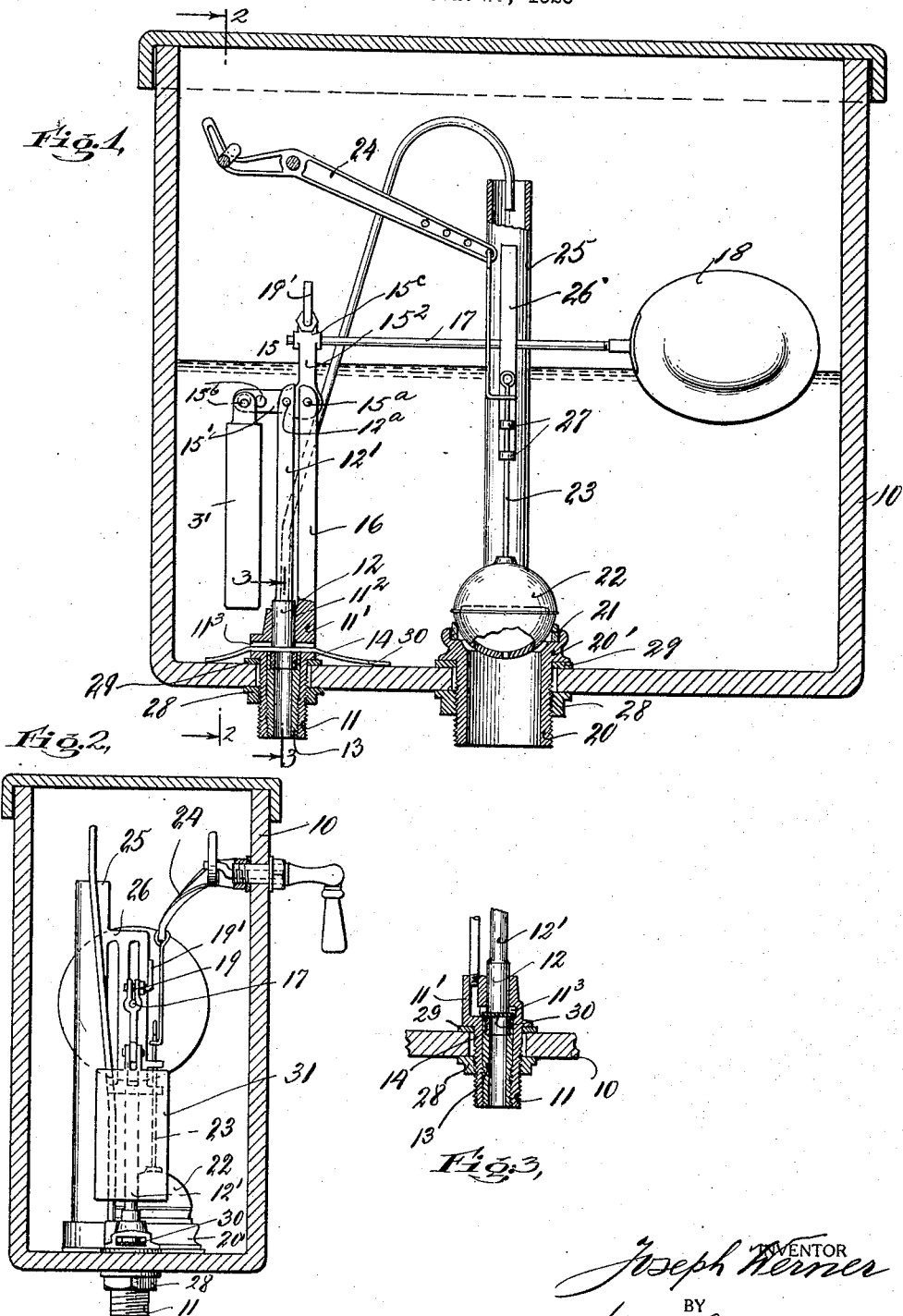

1,620,503

UNITED STATES PATENT OFFICE.

JOSEPH WERNER, OF PERTH AMBOY, NEW JERSEY.

FLUSH BOX.

Application filed June 26, 1926. Serial No. 118,730.

This invention relates to cisterns or flush tanks for flushing the bowls of closets or the like.

With flush tanks of the hitherto used construction it is a frequent occurrence that the ball or float controlled valve mechanism quickly gets out of order or breaks due to corrosion or rusting. Another drawback attached to such tanks is that when the washer of the water inlet or so-called stop valve wears out the whole valve must be removed from the tank to enable the replacing thereof. There is also the drawback that the float or ball due to corrosion often ceases to rise to its full capacity or to the top of the water level to exert sufficient pressure on the stop valve as a result of which the latter fails to close completely.

One object of this invention is to so improve the construction that all above-named drawbacks will be completely removed and the valve mechanism rendered durable and effective. This object I accomplish by a novel construction, arrangement and combination of parts of which the valve mechanism is composed.

One of the chief novel features of my invention resides in the provision of an adjustable and removable glass valve seat. Another feature is the provision of a partly or wholly counterbalanced ball controlled valve body. A still other novel feature is the provision of a comparatively long flexible strip of waterproof material, such as rubber or leather, which is displaceably mounted between said valve body and glass seat and which in length is a multiple of the diameter of the valve body so that by the mere displacement or adjustment of said strip in longitudinal direction always a fresh piece of said strip can be brought in alignment with the valve body and seat to serve as a washer in lieu of the ordinary washer. A still further object of this invention is to provide means whereby the leverage of the float can be adjusted and the removal or the tightening thereof can be easily and quickly accomplished.

Another novel feature of this invention is the provision of guide members both for the arm carrying the ball or float and for the rod carrying the rubber ball of the discharge valve, which guiding members are cast in one piece with or made integral parts of the overflow pipe, whereby the construction is greatly simplified and the movable parts are properly guided.

Other novel features will appear from the detailed description of this invention.

In the accompanying drawing which forms part of this specification and in which similar reference characters denote corresponding parts—

Fig. 1 is a vertical section of the cistern showing the valve mechanism therein;

Fig. 2 is a section on line 2—2 of Fig. 1; and

Fig. 3 is a section on line 3—3 of Fig. 1.

10 denotes the usual tank of the cistern. 11 is an externally threaded pipe section projecting through an opening in the bottom of the tank and to the outer end of which is adapted to be screwed the pressure water pipe leading from the usual water supply (not shown). The inner end of this pipe section is formed into a head piece $11^1$ provided with a vertical cylindrical bore $11^2$ movably bearing a plunger-like valve body 12 of solid and rigid material, usually metal. This pipe section at its lower end is also internally threaded and receives an externally threaded metal tubing 13. Suitably tightened in the upper part of said tubing to be in alignment with the plunger or valve body 12 is a glass sleeve 14 the upper end of which serves as a valve seat. By screwing the tubing 13 in or out in the pipe section 11 the glass seat 14 can be raised or lowered and thus adjusted relative to the plunger 12. Just above the valve seat the head piece $11^1$ is provided with a slot $11^3$ extending transversely of and intersecting the path of the plunger valve. This slot is slightly wider than the diameter of the plunger or of the seat and is adapted to receive a strip 30 of flexible and waterproof material, such as leather or rubber, and of a length which is a multiple of the diameter of the plunger or seat and which is adapted to extend outwardly from said slot. In closing position the plunger 12 will press against the part of the strip located between it and the valve seat thereby producing a tight closure. In open position of the valve the pressure water will raise the strip from above the seat and pass underneath it into the tank.

The plunger valve is formed with an extension $12^1$ which is pivotally suspended from one arm $15^1$ of a bell crank lever 15. This bell crank lever is pivoted at $15^a$ to a bar 16 which projects vertically and laterally from the head piece of the pipe section and which may be formed an integral part of the latter. The pivotal suspension point $12^a$ of the plunger 12 is arranged close to the pivot $15^a$ of the bell crank lever so that the stroke of the plunger or valve body 12 will be relatively small. The arm $15^1$ of the bell crank is provided with two or more holes $15^b$ for the adjustable suspension of a counterweight 31. The other arm $15^2$ of the bell crank lever 15 at its free end is formed into a split sleeve $15^c$ which is adapted to engage the free end of the rod 17 carrying the ball or float 18. A clamping screw 19 formed with a handle $19^1$ and working in the slit portion of the sleeve serves for clamping the rod in said sleeve. The discharge in the tank comprises an externally threaded pipe section 20 which projects through another opening in the bottom of the tank and to the outer end of which is adapted to be screwed the pipe leading into the bowl (not shown). The inner end of this pipe section 20 is enlarged or formed into a head piece $20^1$ in which is suitably tightened a glass ring or sleeve 21 which serves as a valve seat for the usual rubber ball 22 constituting the valve for the discharge. This rubber ball is attached to a rod or wire 23 which is suitably suspended from the usual manually operable lever 24. Fastened in said head piece in a suitable manner and projecting therefrom vertically is the overflow pipe 25. This overflow pipe is formed integrally with a laterally projecting and longitudinally slotted member 26 which serves as guide for the arm 17 of the ball or float 18. It is also provided with lateral guide members 27 for the rod 23 of the rubber ball.

The function of the counterweight is to counterbalance partly or wholly the float or ball so that the latter will more easily rise to its highest position in case of any friction due to rust opposing the movement of the bell crank.

Another function of this counterweight is to automatically close the stop valve when the float or its arm breaks. 28 denote nuts working on the pipe sections 11 and 20 and serving to clamp the latter in position and 29 are packing rings.

What I claim and desire to secure by Letters Patent is:—

1. In a flush tank, a stop valve having a comparatively long flexible strip of waterproof material displaceably mounted between the valve body and seat so as to be freely displaceable in longitudinal direction to either side of said seat and to serve as an adjustable washer.

2. In a flush tank, a stop valve having a glass seat, a plunger like valve body and a comparatively long flexible strip of waterproof material displaceably mounted between said valve body and seat so as to be freely displaceable in longitudinal direction to either side of said seat and to serve as an adjustable washer.

3. In a flush tank, a stop valve comprising a pipe section fixed in said tank, a tubular glass seat adjustably mounted in said pipe section, a plunger like valve body and a comparatively long flexible strip of waterproof material adjustable and displaceably mounted between said valve body and seat and serving as a washer.

4. In a flush tank, a stop valve comprising a float controlled bell crank lever, a valve body suspended from one arm of said bell crank lever, a valve seat and a comparatively long strip of flexible and waterproof material displaceably mounted between said valve body and valve seat so as to be freely displaceable in longitudinal direction to either side of said seat and to serve as a washer.

5. In a flush tank, a stop valve comprising a counterbalanced ball controlled bell crank lever, a valve body suspended from said bell crank lever close to the pivotal point of the latter, and a vertically adjustable glass valve seat.

6. In a flush tank, a ball controlled stop valve comprising a ball and a ball carrying arm, and an overflow pipe formed integrally with guide members for said ball carrying arm.

7. In a flush tank, a ball controlled stop valve comprising a ball and a ball carrying arm, a discharge pipe and a manually operated discharge valve, an overflow pipe communicating with said discharge pipe and formed integrally with guide members for said ball carrying arm and said discharge valve.

In testimony whereof I affix my signature.

JOSEPH WERNER.